United States Patent [19]

Brown et al.

[11] Patent Number: 5,145,101

[45] Date of Patent: Sep. 8, 1992

[54] TWEEZER HANDPIECE FOR INSTALLATION AND REMOVAL OF ELECTRONIC COMPONENTS WITH RESPECT TO A SUBSTRATE AND TIPS AND TOOL FOR USE THEREWITH

[75] Inventors: Robert G. Brown, Annapolis; Edward Faygenblat; Robert S. Quasney, both of Baltimore; Charles M. Cardno, Ellicot City; William J. Siegel, Silver Spring, all of Md.

[73] Assignee: Pace Incorporated, Laurel, Md.

[21] Appl. No.: 710,343

[22] Filed: Jun. 5, 1991

[51] Int. Cl.⁵ .............................................. B23K 3/03
[52] U.S. Cl. ...................................... 228/51; 228/55; 228/56.5; 16/223; 16/225; 16/235; 16/388
[58] Field of Search ............... 228/6.2, 44.7, 51, 55, 228/56.5, 191; 219/229, 230, 238; 294/99.2; 16/223, 225, 235-237, 277, 388

[56] References Cited

U.S. PATENT DOCUMENTS

| | | | |
|---|---|---|---|
| 1,483,920 | 2/1924 | Wamser | 16/235 |
| 2,859,473 | 11/1958 | Warren | 228/55 |
| 3,703,742 | 11/1972 | Konishi | 16/388 |
| 3,804,320 | 4/1974 | Vandermark | 228/20 |
| 3,895,214 | 7/1975 | Winter | 228/51 |
| 3,980,861 | 9/1976 | Fukunaga | 228/51 |
| 4,034,202 | 7/1977 | Vandermark | 228/19 |
| 4,187,972 | 2/1980 | Vella | 228/55 |
| 4,591,696 | 5/1986 | Eisen | 228/51 |
| 4,605,152 | 8/1986 | Fridman | 228/6.2 |
| 4,620,659 | 11/1986 | Holdway | 228/20 |
| 4,828,162 | 5/1989 | Donner et al. | 228/51 |
| 4,899,920 | 2/1990 | Abbagnaro et al. | 228/20 |

FOREIGN PATENT DOCUMENTS 2529273 12/1976 Fed. Rep. of Germany ........ 228/55

OTHER PUBLICATIONS

Plato Products, Inc., Hot Grips brochure, Oct. 16, 1989.
Nu-Concept Systems, Inc., Pak Up Your Troubles brochure.
Nu-Concept Systems, Inc., The Removal and Reattachment . . . brochure.
Knuergg AG, SMD Soldering Tweezers brochure.

*Primary Examiner*—Samuel M. Heinrich
*Attorney, Agent, or Firm*—Sixbey, Friedman, Leedom & Ferguson

[57] ABSTRACT

A tweezer-type heating device for installation and removal device of electronic components with respect to a substrate, such as for SMC installation and through hole installation or removal. More specifically, a handheld tweezer-type heating device is provided in which a wide variety of different sized (and shaped) tips can be used with a high degree of accuracy in terms of thermo/mechanical contact. Tolerances in the parts of the handpiece, the assembly, the heaters and the tips that may bring the bottom edges of the tips out of their alignment plane are very easily corrected with an adjustable hinge which, by loosening of a screw and sliding the parts with respect to each other, allows proper alignment to be achieved. Still further, a thumb screw is provided at the back of the handpiece to allow the gap between the tips to be slightly opened or closed. This is useful in accommodating tolerances in the components. Also, it allows the operator to slip-fit the tips over the component and make proper thermo/mechanical contact with little or no squeezing of the handpiece, thereby minimizing the chance of mechanically damaging the component or its leads by squeezing too hard, or causing damage to adjacent components. A plate-like alignment tool with projecting tab portions that engages in an edge slot of the tip elements and contacts other surfaces of the tip elements, as well, enables simultaneous aligning of the tip elements axially, laterally and rotationally with respect to each other and the mounting units.

32 Claims, 5 Drawing Sheets

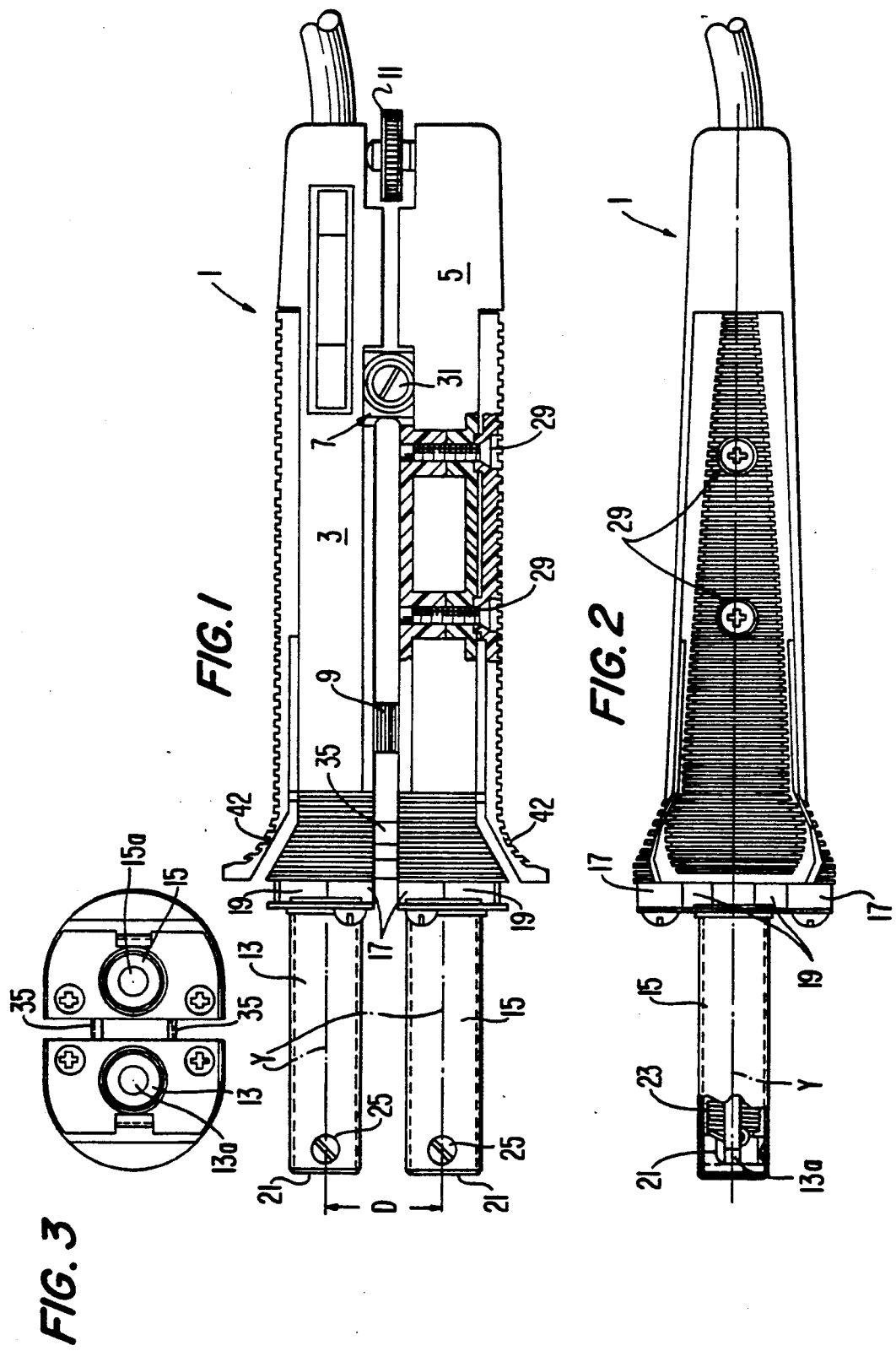

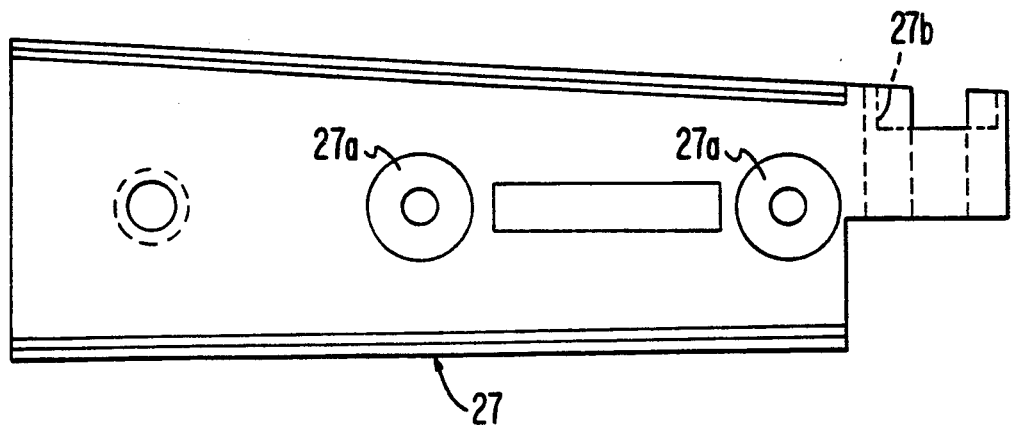
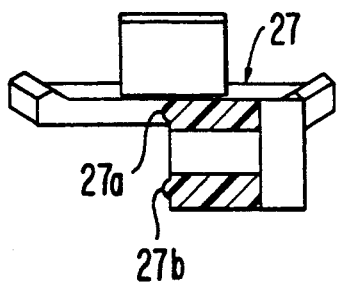
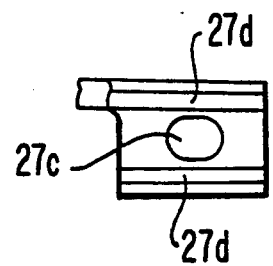
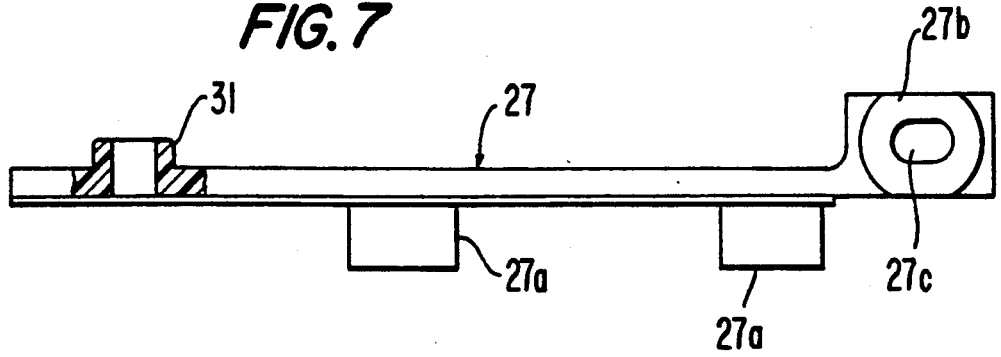

TWEEZER HANDPIECE FOR INSTALLATION AND REMOVAL OF ELECTRONIC COMPONENTS WITH RESPECT TO A SUBSTRATE AND TIPS AND TOOL FOR USE THEREWITH

BACKGROUND OF THE INVENTION

1. Field of the Invention

This invention relates generally to handheld tweezer-like tools which, via conductive heat transfer, reflow solder and effect the installation and removal of electronic components with respect to a substrate. "Electronic components" or simply "components", as it is used herein, include any device, electronic, active, inactive or otherwise, which is mounted on, through or otherwise attached to a substrate, either mechanically, by solder, adhesive or any combination thereof. Substrates, as the term is used herein, encompasses any material to which components may be mounted. These materials include (but are not limited to) fiberglass (i.e., FR-4), ceramic, polyimide, flex, capton, copper-clad invar, etc.

2. Description of Related Art

Components of the above-noted type are generally classified as being of a surface mount or through hole mount type. Surface mount components are attached on the surface of a substrate to electrically conductive lands disposed thereon, principally by solder. Through hole mount components are, principally, attached mechanically and by solder, via a component lead or leads passing through (plated or unplated) holes in the substrate. Various adhesives may, additionally, be employed in the attachment of components with respect to a substrate.

Examples of surface mount components include (but are not limited to) leaded components, such as PLCCs, flatpacks, SOTs, PQFPs, sockets, connectors and the like; and leadless components such as capacitors, diodes, LCCCs and the like. Through hole components are generally of the leaded variety and include such devices as DIPs (Dual In-line Packs), axial-leaded resistors, transistors and the like.

Modern electronics are incorporating an ever-increasing percentage of surface mount components in high density assemblies. These electronic assemblies are often very expensive and sensitive to thermal and/or mechanical damage, electrostatic discharge (ESD) and electrical overstress (EOS) damage. Products incorporating such assemblies include fax machines, pagers, personal computers, communication systems and a variety of other consumer and industrial goods. This has brought about the need for a safe, economical, rapid and effective means (i.e. proper means) by which such components can be removed and installed with respect to the substrate, either during the initial assembly and rework of the electronic assembly (i.e., circuit board), or during repair in the field.

A number of devices have been developed to deal with this task. The assignee of the present invention holds U.S. Pat. Nos. 4,605,152; 4,620,659; and 4,899,920, for example, which disclose large bench-top devices for the installation and removal of surface mount components (SMCs) utilizing convective (heated air or gas) means to effect solder reflow attendant to such installation and removal procedures. Such devices are effective, but are relatively costly.

Conductive (i.e, by contact) heating devices are less costly but, to be effective, must have sufficient thermal capacity and make good physical contact with all of the solder joints, leads or lands in order to properly transfer heat and effect solder reflow. U.S. Pat. Nos. 3,804,320 and 4,034,202, have addressed the installation and removal of the, then, emerging technology of multi-leaded integrated circuits (i.e., DIPs) and other through hole components via a manual, conductive method which employed tweezer-like handles and heated tips to effect mechanical gripping, reflow and removal of through hole components. Other similar devices have followed, yet there were many problems associated with all of them.

Proper removal of a surface mounted component, especially a large thermally massive component on a high thermal mass substrate (i.e. a multilayer substrate or one with a large ground or voltage plane), requires that a sufficient amount of heat be delivered to all of the solder joints simultaneously in a rapid yet controlled fashion in order to effect complete, even solder reflow. The one step removal of a through hole component, such as a DIP, presents similar requirements, yet is not quite as difficult as the proper removal of a four-sided SMC, as will be revealed in more detail below.

The existing tweezer-type heating devices similar to those described in U.S. Pat. Nos. 3,804,320 and 4,034,202 (sold by Nu-Concept Systems, Inc., assignee of these patents) and other known tweezer-type heating devices (i.e., the HOT GRIPS® of Plato Products, Glendora, Calif. and the SMD soldering tweezers of Knürr AG, Munich, Germany) cannot effect the proper removal of a great many through hole and surface mount components, due to inherent deficiencies in their design. These design deficiencies can be classified into two important requirement areas, namely, thermal throughput and thermo/mechanical contact.

Thermal throughput refers to the device's ability to produce and deliver heat—in sufficient quantity and at a sufficient rate—to the tips which, in turn, transfer heat to the solder joints via contact, typically with the component lead and/or the solder itself, and effect solder reflow. This is determined by the physical layout of device; the wattage, thermal coupling of the heater, bobbin, and tip with respect to one another; available power to the handpiece; and other factors; and is generally manifested in the ability of the device to (1) maintain the tips at a sufficiently high idle temperature, (2) continually drive heat into the tips and, in turn, the joints during the joint heating phase, and (3) quickly return the tips to their preselected idle temperature after being depleted of heat from having contacted the work (i.e, tip temperature recovery). Tips for the larger surface mount components (i.e, 84 lead PLCCs or 132 lead PQFPs and larger) are rather massive and have relatively large surface areas. Such tips lose a great deal of heat through dissipation and thus, require a great deal of thermal energy to remain at a sufficiently high temperature to effect proper solder reflow This temperature should typically be between 400° and 900° F. depending on the particular application.

However, existing heated tweezer-type devices of the type described above lack the power and/or thermal efficiency to maintain tips for large surface mount components at sufficiently high temperatures. Such devices also lack the thermal throughput required to continually supply a sufficient amount of heat during the joint heating phase, so that complete solder reflow is achieved in a safe and acceptably rapid time period. In many cases, SMC removal cannot be achieved at all because complete solder reflow cannot be achieved. Finally, these devices lack the thermal throughput to achieve rapid idle tip temperature recovery, so that successive SMC removal operations cannot be successfully accomplished in an acceptably rapid fashion.

Thermo/mechanical contact refers to the ability of the tip/handpiece combination to make reliable mechanical contact with all of the solder joints, simultaneously, so that heat is rapidly transferred into the joints in order to effect the rapid, complete, simultaneous solder reflow that is required for proper component removal. Proper thermo/mechanical contact is achieved when the operator can successfully accomplish this with relative ease. The design elements of these devices which affect thermo/mechanical contact are: the design and configuration of the handles, the hinge, alignment of heaters, alignment of tips, orientation and engagement of the tips to the heater, precision of the tips, travel of the handles/tips during use, and other important factors such as the ability of the operator to achieve good thermo/mechanical contact using the device.

Prior devices, such as those described above, lack the ability to achieve proper thermo/mechanical contact for many components, especially larger SMCs. The Nu-Concept devices, described in U.S. Pat. Nos. 3,804,320 and 4,034,202, were designed primarily to remove DIPS in a one-step operation. In order to effect proper thermo/mechanical contact with the leads of a DIP, the surfaces of the opposing tips have to engage the parallel opposing rows of leads in a parallel fashion in order to make good thermo/mechanical contact or "thermal engagement". Due to inherent tolerances in the device, the tips (including their engagement to each other) and in the component itself, parallelism of the tips with respect to the component leads (as well as with respect to each other) is often difficult, if not impossible to achieve.

U.S. Pat. Nos. 3,804,320 and 4,034,202 addressed this problem by providing a hinge pin tolerance or movement, causing the tips and the device's legs to pivot slightly (along a "y" axis that is parallel to the length of the legs of the tweezer and normal to an "x" axis which passes through the hinge and about which the legs of the tweezer articulate "open" and "closed" with respect to each other), so that any deviation from parallelism could be overcome by squeezing the handles tightly enough to shift the tip into a-parallel relationship to the opposing parallel rows of leads on a DIP. However, this solution does not work very well since it necessitates a very hard squeezing action on the part of the operator (which could damage the component as well as the device) and the coincidence of the "y axis" tolerance in the hinge with the error in parallelism of the tips, which often does not occur.

Another problem associated with the device described in U.S. Pat. No. 3,804,320, is that varying widths of DIPs or other devices could cause the planar surfaces of the tips to not engage the plane formed by the vertical portions of the leads of the DIP in a parallel fashion. A similar problem would exist with SMCs. Such parallel contact of the planes is desirable to maximize the contact area or thermal linkage for optimal heat transfer and solder joint reflow. Although this lack of planar parallelism is noted as intentional and desirable in U.S. Pat. No. 4,034,202 for the purpose of minimizing the transfer of heat to the component body, it is generally desirable to have maximum thermal contact area with leads of SMCs (especially large SMCs) due to the generally greater thermal mass of such components and correspondingly greater heat required for complete solder reflow.

This problem arises due to the inherent design of these devices. Since the tips move along an arc as they are brought together, their angularity must take into account the width of the component if the tips are to engage the component leads in a perfectly planar or near perfectly planar fashion. Although this problem can be addressed by employing dedicated (as opposed to interchangeable) handpiece/tip combinations as may be suggested by U.S. Pat. No. 4,034,202, this would require having a very large number of handpieces, cords and power sources to conveniently deal with today's ever-increasing diversity of SMC sizes and configurations in practical environments.

Prior devices discussed above also did not anticipate the even greater challenges of establishing proper thermo/mechanical contact with four-sided SMCs. The additional requirements of four-sided devices over two-sided devices include the precision of the angle (typically 90°) between adjacent sides of the tip portion on each leg of the tweezer handpiece. Additionally, it is even more important with four-sided SMCs that the bottom edges of the two tip halves lie in a common plane, which is generally (but not always) perpendicular to the longitudinal or y-axes of the tweezer legs. Manufacturing of such tips to a sufficient degree of precision can be very expensive in that secondary machining processes are required.

Prior tweezer-like heating devices employ a relatively long arcuate travel distance against a spring load until the tips contact the component. This can be very inconvenient and uncomfortable to the operator. In addition, this travel distance makes it difficult to safely access a component in a high-density electronic assembly in which adjacent components can typically be 0.050 in. away or closer.

SUMMARY OF THE INVENTION

Therefore, it is a primary object of the present invention to provide a handheld tweezer-type heating device which has sufficient thermal throughput and can thereby, properly reflow and remove large surface mount components in rapid succession—even those on relatively high thermal mass substrates.

It is yet another primary object of the present invention to provide a tweezer-like, handheld heating device and an array of interchangeable tips for the reflow and removal of components in which thermo/mechanical contact is optimized for a wide variety of sizes and configurations of components utilizing one universal handpiece.

Another primary object of the present invention is to provide a handpiece and an array of interchangeable tips which can be produced inexpensively yet with sufficient precision that any tolerance in the tip or the component can be sufficiently compensated for by simple and readily made adjustments in the handpiece itself.

It is a further object of the present invention to provide a convenient, yet accurate, means to align opposing tip halves with respect to each other, such that the tips make proper thermo/mechanical contact with the component.

A still further object of the present invention to provide a tweezer-like heating device that is convenient and comfortable to use by an operator of minimal skill level, and which can be adjusted to safely and conveniently engage components in tight areas of high density electronic assemblies with minimal or virtually no travel.

The above objects and others are achieved in accordance with a preferred embodiment of the invention which, although primarily an SMC removal device can be used for SMC installation and through hole installation or removal, as well, with appropriate tips. More specifically, a handheld tweezer-type heating device is provided in which a wide variety of different sized (and shaped) tips can be used with a high degree of accuracy in terms of thermo./mechanical contact due to the provision of a constant gap between the longitudinal or y-axes of the tweezer arms, and all of the various sized tip elements being produced, such that the gap between their two respective halves remains similarly constant. In this way, tips remain in the same plane (generally orthogonal to the y-axes) as they contact the solder joints or leads of the component. Tolerances in the parts of the handpiece, the assembly, the heaters and the tips that may bring the bottom edges of the tips out of their alignment plane are very easily corrected with an adjustable hinge which, by loosening of a screw and sliding the parts with respect to each other, allows proper alignment to be achieved.

Still further, a thumb screw is provided at the back of the handpiece to allow the gap between the tips to be slightly opened or closed. This is useful in accommodating tolerances in the components. Also, it allows the operator to slip-fit the tips over the component and make proper thermo/mechanical contact with little or no squeezing of the handpiece, thereby minimizing the chance of mechanically damaging the component or its leads by squeezing too hard; or thermally and/or mechanically damaging adjacent components.

BRIEF DESCRIPTION OF THE DRAWINGS

FIG. 1 shows a partially broken-away side view of a tweezer handpiece in accordance with a preferred embodiment of the invention;

FIG. 2 shows a partially broken-away bottom view of the handpiece of FIG. 1;

FIG. 3 is a front end view of the handpiece of FIG. 1;

FIG. 4 is a top view of a first hinge member of the handpiece of FIG. 1;

FIGS. 5, 6, and 7 are end, partial inner side and outer side views of the hinge member of FIG. 3;

DETAILED DESCRIPTION OF THE PREFERRED EMBODIMENT

Figure 8:
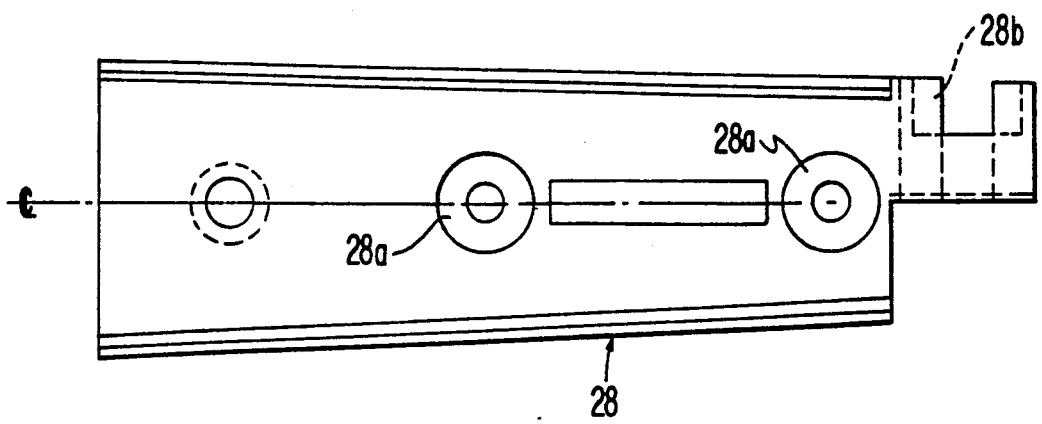
FIG. 8 is a second hinge member of the handpiece of FIG. 1.
Figure 9:
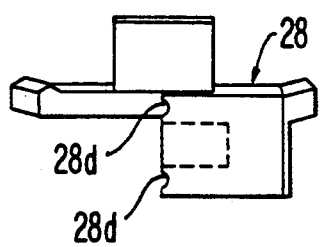
FIGS. 9, 10 and 11 are end, partial inner side, and outer side views of the hinge member of FIG. 7.
Figure 10:
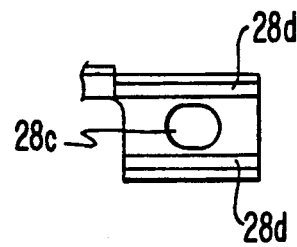
Figure 11:
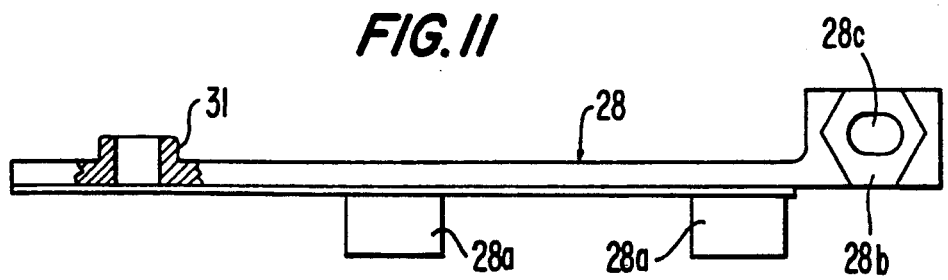
Figure 12:
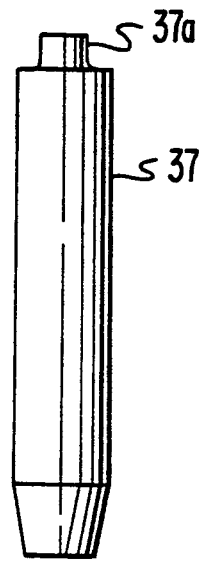
FIG. 12 is an enlarged elevational view of an attachment pin of a tip member for use with the handpiece of FIG. 1.

FIGS. 1 and 2 show a handpiece 1 of a handheld, tweezer-like tool which, together with tip elements (such as tip element 2, 2', described relative to FIGS. 11–16, below) forms a conductive heating device via which electronic components may be installed and removed from a substrate by producing a solder reflow, especially for SMC removal. Handpiece 1 has a pair of legs 3, 5 that are pivotally connected via a hinge 7. A spring 9 acts to spread the legs 3, 5 apart to an extent that is controlled by a thumb screw 11, which has one end threaded into an inner side of the rear end of leg 5, and the opposite end of which is rounded and engages a facing abutment surface on the inner side of the bottom end of leg 3. Thumb screw 11 serves a purpose to be described in greater detail below. Additionally, at the front end of each leg 3, 5, a heating bobbin unit 13, 15 for a tip 2, 2', etc. is mounted, and within which an electrical resistance heating element 23 is coiled.

Each of the bobbin units 13, 15 is secured to its respective handpiece leg 3, 5 upon projecting mounts 17 that create an air gap 19 between the bobbin units 13, 15 and the handpiece legs 3, 5. Gaps 19 serve as a thermal break which limits transference of heat from the bobbin units 13, 15 to the handpiece legs 3, 15. As can be seen from FIG. 3, the bobbin units 13, 15 have openings 13a, 15a in their top ends for receiving tip elements 2, 2' etc. Tip elements are inserted into these openings 13a, 15a until they bottom out on a heat conductive end face 21 of the bobbin units. Then, a set screw 25 can be used to hold each of the tip elements 2, 2', etc. in place, once they have been aligned, as described later on.

Tolerances in the parts of the handpiece, and/or the tips, and/or resulting from the assembly operation, can cause the edges of the tips to be out of alignment in the longitudinal direction (axis y). Such a problem is easily correctable with adjustable hinge 7, as will be more apparent from the following, with reference to FIGS. 4–8.

In particular, the hinge 7 is comprised of a first hinge member 27 (FIGS. 4–7) and a second hinge member 28 (FIGS. 8–11). Each of these hinge members 27, 28 is attached to an inner side of one of the tweezer legs 3, 5 via fastening screws 29 (FIGS. 1 and 2) that are threaded into screw bosses 27a, 28a. The hinge members 27, 28 are connected by a screw 31 (FIG. 1) but do not pivot about screw 31 as is more fully described below. Conveniently, a recess 27b is provided in which the head of screw 31 can be recessed and a hexagonally shaped recess 28b can be provided for receiving a clamping nut (not shown), so that the nut will be restrained against rotation without the need for manually doing so for tightening and loosening the connection between the hinge members 27, 28. Screw 31 serves as a guide part of a means for longitudinally aligning a first tip element mounted on one of the tweezer legs with a second tip element mounted on the other of the tweezer legs due to the fact that it is received in a guide hole 27c, 28c of a guide portion of the hinge members 27, 28. Guide holes 27c, 28c extend crosswise through each of the hinge member and each is elongated in a longitudinal direction of the tweezer legs, as is apparent from FIGS. 6, 7 and 10, 11.

Thus, when the screw is fully tightened, the hinge members 27, 28 will be firmly held against one other at the facing surfaces of the guide portions, so that relative longitudinal displacement between the hinge members 27, 28 and the tweezer legs 3, 5, of which they form a part, will be precluded. Once the screw 31 is slightly loosened, the hinge members and tweezer legs will be able to longitudinally shift within a limited longitudinal range of movement defined by the combined extent to which the length of the elongated pivot holes 27c, 28c exceed the width/diameter of the guide and clamping screw 31. Furthermore, to facilitate relative longitudinal displacement between the hinge members 27, 28 while eliminating any play due to the pivot screw being of a lesser diameter than the height of the screw holes 27c, 28c crosswise of the longitudinal direction, a longitudinal guide means is provided in the form of at least one, and preferably two male track members 27d on an innerface of one of the hinge members 27, 28. Each track members 27d is received in a respective interengaging female track member 28d (FIGS. 9 and 10) that is formed in an innerface of the other of the hinge members. These track members 27d, 28d allow free relative longitudinal displacement while precluding a lateral shifting of the hinge members 27, 28 which could result in a skewing of tweezer legs and the tip elements carried thereby relative to each other (i.e., the type of y-axis pivoting permitted by the above-noted U.S. Pat. Nos. 3,804,320 and 4,034,202 is precluded). Although longitudinal alignment of tip members in a common plane could also be achieved by other means such as moving tip portions 2, 2' longitudinally with respect to each other within openings 13a, 15a, hinge 7 allows such alignment of tips while in abutting contact with conductive end face 21 thereby maximizing thermal through put and ease of alignment.

Additionally, the hinge members 27, 28 are provided with mounting posts 31 for holding coil spring 9 in place. Posts 31 also double as stops which prevent the tip elements or the component from being mechanically damaged by application of too much force to the handpiece legs 3, 5.

It should be appreciated that the hinge-like behavior of hinge 7, in the present case, is due to the resilient flexibility of the plastic material of which the hinge members 27, 28 are formed, and relative to which the spring 9 exerts sufficient force to flex, to the extent permitted by the set position of thumb screw 11; however, one or more transversely extending grooves could be provided to facilitate such flexion or an actual pivot pin interconnection could be provided between the relatively thin body portion of the hinge members and the thicker clamping portions of the hinge members. Also, while in the present embodiment, the resilient flexibility of the plastic material of which the hinge members 27, 28 are formed merely supplements the return action of spring 9, it is possible to construct the hinge members to fully perform the function of spring 9, in which case it can be eliminated.

In addition to the longitudinal guidance provided by the interengaging male and female track members 27d, 28d, guidance for the arcuate pivoting motion of the tweezer legs can be provided. For example, a pair of guide arms 35 (FIGS. 1 and 3) can project laterally from one of the tweezer legs 3, 5, and can run along inner guide surfaces within the other of the tweezer legs. Furthermore, because of the minimal amount of arcuate opening and closing movement of legs 3, 5 required, these guides 35 can be located up-front near the free ends of the legs where they will be most effective, they need not be arcuate, and they can remain in contact with the guide surfaces of the other (guide surface) leg at all times without the guides having to be so long that their ends have to be able to project out through the guide surface leg when the pair of legs 3, 5 is brought together.

Examples of tip elements for use with the above-described handpiece 1 will now be described with reference to FIGS. 12-17. Firstly, it is noted that the handpiece is designed for use with a wide variety of differently sized and/or shaped tips that are designed to produce a high degree of accuracy in terms of thermo/mechanical contact with the component leads to be soldered or desoldered, so that the two illustrated tips 2, 2', should be viewed simply as being exemplary in nature.

Each of the tip elements 2, 2' comprises an attachment pin portion 37 and a conductive heating element portion 39, 39'. A top end of the attachment pin portion 37 has a fixing projection 37a which is inserted through an opening 39a in an attachment part 39b, 39'b of the conductive heating tip portion 39, 39', and then is swaged down into a beaded head that firmly holds them on the attachment pin portion 37.

Additionally, attachment pin portion 37 has an outer diameter which is just enough smaller than the diameter of openings 13a, 15a of the bobbin units 13, 15 to be able to freely slide in and out of them. The length of the attachment pin portion 37 is selected to be sufficiently long to maximize heat transfer from the heating element 23, yet is made short enough to enable the attachment part 39b, 39'b of the conductive heating tip portion 39, 39' to abut on the conductive heating end face 21 of the bobbin units 13, 15, when attachment pin portion 37 is fully inserted. In this way, thermal throughput from the bobbin units 13, 15, through the tip elements, to the solder joints will be optimized, and axial alignment of the tip elements is facilitated.

Figure 13:
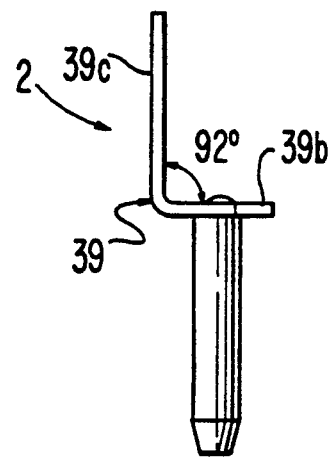
FIG. 13 is a side view of a first tip member for use with the handpiece of FIG. 1.
Figure 16:
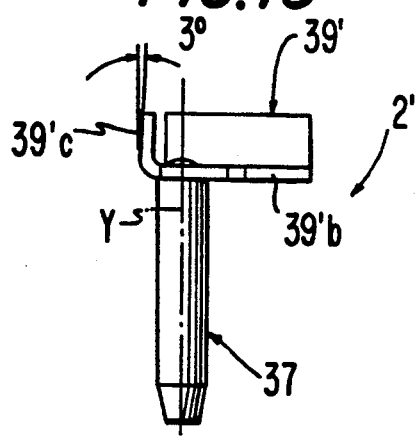
FIG. 16 is a side view of a second tip element for use with the handpiece of FIG. 1.
Figure 17:
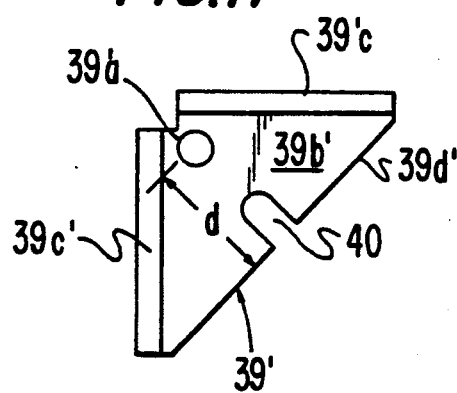
FIG. 17 is a top view of the tip of the FIG. 15 tip element.

As can be seen from FIGS. 13 and 16, the attachment part 39b, 39'b extends orthogonal to the attachment pin portion 37 and, thus, also relative to the tweezer leg to which it is mounted. Of particular importance, and advantageous for enabling a wide variety of differently sized and shaped tips to be used with a high degree of accuracy in terms of thermo/mechanical contact, is the fact that the distance D (FIG. 1) between the y-axes of the bobbin units 13, 15 is set at a fixed value, such as $\frac{3}{4}''$, and all of the various differently sized and/or shaped tips are then produced so as to have a distance d (FIGS. 14 and 17) between the y-axis of attachment pin portion 37 (which passes axially through the center of the pin portion 37 and the opening 39a, 39'a) and the facing edge 39d, which is generally less than half of D and is set at a value which, when the tweezer arms 3, 5 are brought together to the point where the y-axes are parallel to each other, the pair of tip elements 2, 2' will come together, with a small clearance gap between their facing edges, in a manner such that their attachment surfaces 39b, 39'b will be generally orthogonal to the y-axes of the bobbin units 13, 15 and tweezer arms 3, 5 and the free end edges of the heating surfaces 39c, 39'c will be in the same plane, this plane being generally, but not necessarily, orthogonal to the y axes. This is important because it enables the side heating surfaces 39c, 39'c to contact the vertical surfaces of the leads over a maximum contact area.

In this regard, the heating surfaces 39c can be parallel with respect to pin portion 37 or can be at varying angles so that the thermo/mechanical contact the leads, joints or terminations of a particular component or class of components is maximized. Similarly, the heating surfaces 39'c may extend totally parallel to the pin portion, in some cases; but, to maximize thermo/mechanical contact with certain components, in other cases, (as is evident in FIG. 16) the heating surfaces 39c' are not parallel, being bent inward slightly (approximately 3°) in order to conform with the same slight inclination of the J-leads of, for example, PLCC components, and to engage the solder fillets at the lands of the substrate. Thus, in the case of a tip element 2, the heating surface 39c extends outwardly away from the central longitudinal axis of said pin portion 37 at an obtuse angle relative to the attachment part 39b while, in the case of a tip element 2', the heating surface 39'c extends inwardly toward the central longitudinal axis y of the pin portion 37 at an acute angle relative to the attachment part 39'b.

The noted orientation of the tip elements of the invention allows the tip element to be aligned "on all fours" during a soldering/desoldering process in comparison to the compound angle approach of prior art devices; although a similar compound angle could be produced simply by angling the attachment pin portion 37 and increasing the diameter of the fixing projection 37a that is attached to the attachment surface 39b, 39'b in order to maximize the heat flow path. Another advantage of the preferred orientation illustrated is that, with the heating tip portion 39, 39' fixed on the attachment pin portion 37 at a 90° orientation, separate left and right tips as would be required if a 45° orientation were utilized become unnecessary. That is, a given tip element 2, 2' etc. can be interchangeably utilized on either bobbin unit 13, 15 together with a second, like tip element. Further, the heating tip portion 39, 39' can be relatively inexpensively produced of stamped parts that are easily modified by bending; for example, by bending of the elongated tapering portion of the blank shown in FIG. 15 into the configurations shown in FIGS. 13 and 14.

Figure 14:
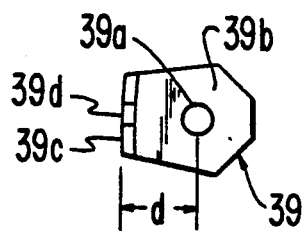
FIGS. 14 and 15 are top and development views of the tip of the FIG. 13 tip member.
Figure 15:
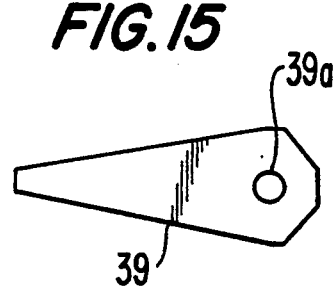
Figure 18:
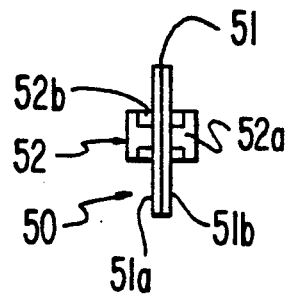
FIG. 18 is an end view of a tip alignment tool for use with tip elements as shown in FIGS. 16 and 17.
Figure 19:
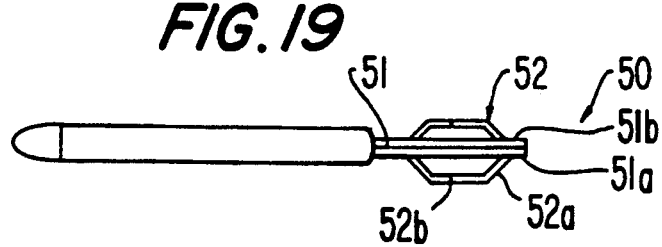
FIG. 19 is a side elevational view of the alignment tool shown in FIG. 18.
Figure 20:
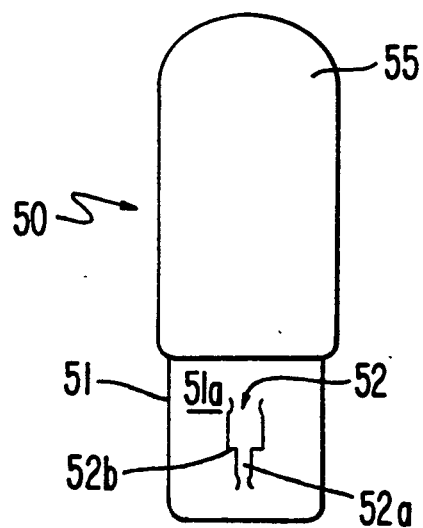
FIG. 20 is a front or back elevational view of the alignment tool shown in FIG. 18.

Before fixing of the tip elements 2, 2' within the bobbin units 13, 15 via the set screws 25, they must be properly aligned. In the case of a small tip as shown in FIGS. 13-15, in which only a single heating surface 39c is provided, the tweezer legs 3, 5 can merely be brought together until the flat edges 39d of the pair of tip elements mate with the surfaces 39c facing each other. On the other hand, in the case of a pair of tip elements 39 which are to form a square, a tip alignment tool 50 (FIGS. 18-20) is engaged in the tip alignment slots 40 of the pair of tip elements and the tweezer legs 3, 5, then, squeezed together until the edges 39'd contact the wall surfaces 51a, 51b of plate portion 51 of the tip tool 50, and portions 52a of the tool's projecting tabs 52 are firmly seated in both alignment slots 40. The tool 50 is then press axially toward the tip elements, bringing the edges 52b of tabs 52 into engagement on the top surface of attachment parts 39'b and pressing the attachment parts into contact with the end faces 21, after which the setscrews 25 are tightened.

While a plate-like tool 50 having generally T-shaped projecting tabs 52 is shown for use with tip elements 2' which have a plate-like attachment part 39'b with a rectangular slot 40 in its facing edge 39'd, it should be appreciated that the same result can be achieved in the same manner using slots 40 and projecting tabs 52 of other shapes. Likewise, a handgrip 55 is formed over plate portion 51 by a simple plastic sleeve; but, handgrips of other types and configurations could be attached to the bottom end of the plate portion instead. Also, instead of forming the plate portion of a pair of plates, each of which has been stamped to form a respective tab 52, the plate portion could be formed of a single cast or molded, metal or hard plastic part have integral, solid projections equivalent to the tabs 52.

Since the alignment tool 50 has surfaces 51a, 51b that sit flush against edges 39'd, the tab portion 52a is matched to the slots 40 and the edges 52b engage on the attachment part 39'b, alignment can be perfectly assured axially, transversely and rotationally. Furthermore, by aligning the tip elements with a clearance gap between them that is set by the thickness of plate portion 51, when grasping a component, the heating tip portions 39' will not have to come all the way together to properly contact the component, thereby allowing the tips elements to accommodate the "bumpers" of PQFPs and allowing the tip elements to be squeezed together as far as necessary to ensure good thermo/mechanical contact with all of the component leads, despite tolerance variations.

Also, since the tip portions 39, 39' are tinnable and are tinned prior to use, the heat transferring contact area between the tip portions 39, 39' and the component leads is enhanced. Furthermore, it should be appreciated that tips can be designed for any given type and size component including PLCCs (J-leads), LCCCs (leadless), large PQFPs (with extended leads) and various other kinds of chip components.

The thumb screw at the rear end of the handpiece 1 allows the gap between the tips to be slightly opened or closed, which is useful in accommodating tolerances in the components, and allows the operator to slip fit the tips over the component and make proper thermo/mechanical contact with little or no squeezing of the handpiece. As a result the chance of mechanically damaging the component or its leads by squeezing too hard is minimized. Also, the greatly reduced travel of the handpiece legs 3, 5 permits safer, easier accessing of the component on high density electronic assemblies where thermally sensitive adjacent components can be as close as 50 mils or less. Additionally, the construction of the tweezer legs with a cantilevered gripping portion 42 further acts to minimize the chance of mechanically damaging the component, if the tweezer legs are squeezed together too hard.

From the foregoing, it should now be apparent how the present invention is able to achieve all of the objects initially set out for it, especially via the preferred embodiment disclosed and described above. However, while a particular preferred embodiment of the invention has been shown and described, numerous changes and modifications thereto, beyond those described above, will now be apparent to those of ordinary skill in the art on the basis of this disclosure. For example, instead of using a pair of elongated guide holes 27c, 28c, one of these holes could, itself, be a circular threaded opening that serves as the clamping nut and the other guide hole made more elongated so as to retain the same degree of relative longitudinal displaceability. Also, it will be appreciated that other types of heating elements, units or arrangements may be used to heat the tip elements 2, 2', etc. instead of the bobbin unit shown which uses the resistance coil 23 and conductor element 21. Thus, the present invention should not be viewed as limited to the embodiment and modifications expressly described herein, and instead, should be viewed as encompassing the full scope of the appended claims.

We claim:

1. A tweezer-type solder reflow, conductive heating device comprising a tweezer handpiece having a pair of tweezer legs, a hinge pivotally connecting said tweezer legs for arcuate movement of front ends of the tweezer legs toward and away from each other, a tip element mounting unit mounted on the front end of each tweezer arm, and heating means for heating a tip element mounted to each of the mounting units; wherein an alignment means for longitudinally aligning a tip element mounted on one of said tweezer legs with a tip element mounted on the other of said tweezer legs is provided.

2. A tweezer-type heating device according to claim 1, wherein said means for longitudinally aligning is incorporated into said hinge.

3. A tweezer-type heating device according to claim 2, wherein said hinge comprises a pair of hinge members, one on each of said tweezer legs, and adjustment means for permitting a limited range of longitudinal shifting of one of said hinge members relative to the other and for securing said hinge members relative to each other in a selected position within said range.

4. A tweezer-type heating device according to claim 3, wherein said adjustment means comprises a guide hole extending crosswise through each of said hinge members, the guide hole through at least one of the hinge members being elongated in a longitudinal direction of said tweezer legs, a guide element passing through said guide hole having a width in said longitudinal direction that is less than the elongation of said guide hole in said longitudinal direction, and means for fixing the position of said guide element within said guide hole.

5. A tweezer-type heating device according to claim 4, wherein the guide hole of both of said tweezer legs is elongated in the longitudinal direction of the tweezer legs.

6. A tweezer-type heating device according to claim 5, wherein longitudinal guide means for preventing lateral shifting of the hinge members relative to each other is provided.

7. A tweezer-type heating device according to claim 6, wherein said longitudinal guide means comprises at least one male track member on an inner face of one of said hinge members and an interengaging female track member on an inner face of the other of the hinge members, in which said male track member is received.

8. A tweezer-type heating device according to claim 7, wherein a screw forms said guide element and a nut into which said screw is threaded forms said means for fixing.

9. A tweezer-type heating device according to claim 1, further comprising a means for setting a position of maximum arcuate movement of the front end of the tweezer legs away from each other and for moving the tweezer arms toward each other.

10. A tweezer-type heating device according to claim 9, wherein a spring is mounted so as to exert a force acting on said tweezer legs in a direction toward said position of maximum arcuate movement; and wherein said means for setting comprises a thumb screw having one end threaded into a rear end portion of one of said tweezer legs and an opposite end engageable on an abutment surface of the other of the tweezer legs.

11. A tweezer-type heating device according to claim 1, wherein said heating means is disposed in said mounting unit and comprises a conductive heating bobbin unit; and wherein each of said tip elements comprises an attachment pin portion, which is securable in said mounting unit in contact with a conductive heating element of the bobbin unit parallel to the longitudinal direction of a respective one of said tweezer legs and a conductive heating tip portion fixed on an end of said pin portion, said heating tip portion having an attachment part to which said pin portion is fixed and at least one heating surface that extends outwardly from said attachment part, at an opposite side thereof from said pin portion.

12. A tweezer-type heating device according to claim 11, wherein said at least one heating surface extends inwardly toward a central longitudinal axis of said pin portion at an acute angle relative to said attachment part.

13. A tweezer-type heating device according to claim 12, wherein said at least one heating surface is oriented so as to define an approximately 87° angle relative to said attachment part, thereby angling inwardly in conformance with J-type component leads and for engaging solder fillets at substrate leads.

14. A tweezer-type heating device according to claim 11, wherein said at least one heating surface extends outwardly away from a central longitudinal axis of said pin portion at an obtuse angle relative to said attachment part.

15. A tweezer-type heating device according to claim 11, comprising a plurality of interchangable pairs of tip elements, the pairs being of respective differing sizes and shapes which, when the tip elements of a pair are aligned with each other with a clearance gap between facing edges thereof, substantially correspond in size and shape to a respective one of various different components; wherein the attachment part of each tip element is perpendicular to the attachment pin portion to which it is attached; and wherein a perpendicular distance from the facing edge of every tip element to a longitudinal central axis of the attachment pin portion of the same tip element is less than one half of an orthogonal distance between central longitudinal axes of the bobbin units that exists when the bobbin units are parallelly disposed with respect to each other.

16. A tweezer-type solder reflow, conductive heating device comprising a tweezer handpiece having a pair of tweezer legs, a hinge pivotally connecting said tweezer legs for arcuate movement of front ends of the tweezer legs toward and away from each other, a tip element mounting unit mounted on the front end of each tweezer arm, heating means for heating a tip element mounted to each of the mounting units and a plurality of interchangable pairs of tip elements; wherein each tip element comprises an attachment pin portion which is securable in said mounting unit, parallel to the longitudinal direction of a respective one of said tweezer legs, and a conductive heating tip portion fixed on an end of said pin portion, said heating tip portion having an attachment part to which said pin portion is orthogonally fixed and at least one heating surface that extends outwardly from said attachment part, at an opposite side thereof from said pin portion; wherein the pairs of tip elements are of respective differing sizes and shapes which, when the tip elements of a pair are aligned with each other with a clearance gap between facing edges thereof, substantially correspond in size and shape to a respective one various different components; wherein the attachment part of each tip element is perpendicular to the attachment pin portion to which it is attached; and wherein a perpendicular distance from the facing edge of every tip element to a longitudinal central axis of the attachment pin portion of the same tip element is less than one half of an orthogonal distance between central longitudinal axes of the bobbin units that exists when the bobbin units are parallelly disposed with respect to each other.

17. A tweezer-type heating device according to claim 16, wherein said at least one heating surface extends inwardly toward a central longitudinal axis of said pin portion at an acute angle relative to said attachment part.

18. A tweezer-type heating device according to claim 17, wherein said at least one heating surface is oriented so as to define an approximately 87° angle relative to said attachment part, thereby angling inwardly in conformance with J-type component leads and for engaging solder fillets at substrate leads.

19. A tweezer-type heating device according to claim 16, wherein said at least one heating surface extends outwardly away from a central longitudinal axis of said pin portion at an obtuse angle relative to said attachment part.

20. A tweezer-type solder reflow, conductive heating device comprising a tweezer handpiece having a pair of tweezer legs, a hinge pivotally connecting said tweezer legs for arcuate movement of front ends of the tweezer legs toward and away from each other, a tip element mounting unit mounted on the front end of each tweezer arm, heating means for heating a tip element mounted to each of the mounting units; wherein a spring is mounted so as to exert a force acting on said tweezer legs in a direction toward a position of maximum arcuate movement of the tweezer arms; and wherein a thumb screw has one end threaded into a rear end portion of one of said tweezer legs and an opposite end engageable on an abutment surface of the other of the tweezer legs as a means for setting said position of maximum arcuate movement of the front end of the tweezer legs away from each other and for moving said tweezer arms toward each other.

21. A tweezer-type heating device according to claim 20, wherein said heating means is disposed in said mounting unit and comprises a conductive heating bobbin unit; and wherein each of said tip elements comprises an attachment pin portion, which is securable in said mounting unit in contact with a conductive heating element of the bobbin unit parallel to the longitudinal direction of a respective one of said tweezer legs and a conductive heating tip portion fixed on an end of said pin portion, said heating tip portion having an attachment surface to which said pin portion is fixed and at least one heating surface that extends outwardly from said attachment part, at an opposite side thereof from said pin portion.

22. A tweezer-type heating device according to claim 21, wherein said at least one heating surface extends inwardly toward a central longitudinal axis of said pin portion at an acute angle relative to said attachment part.

23. A tweezer-type heating device according to claim 22, wherein said at least one heating surface is oriented so as to define an approximately 87° angle relative said attachment surface, thereby angling inwardly in conformance with J-type component leads and for engaging solder fillets at substrate leads.

24. A tweezer-type heating device according to claim 21, wherein said at least one heating surface extends outwardly away from a central longitudinal axis of said pin portion at an obtuse angle relative to said attachment part.

25. A tweezer-type solder reflow, conductive heating device comprising a tweezer handpiece having a pair of tweezer legs, a hinge pivotally connecting said tweezer legs for arcuate movement of front ends of the tweezer legs toward and away from each other, a tip element mounting unit mounted on the front end of each tweezer arm, and heating means for heating a tip element mounted to each of the mounting units; wherein each of said tip elements comprises an attachment pin portion, which is securable in said mounting unit parallel to a longitudinal axis of a respective one of said tweezer legs, and a conductive heating tip portion fixed on an end of said pin portion, said heating tip portion having an attachment part to which said pin portion is fixed and at least one heating surface that extends outwardly from said attachment part, at an opposite side thereof from said pin portion; wherein said attachment part abuts on a free end of a respective said mounting unit when said attachment pin is secured to said respective mounting unit for optimizing thermal throughtput from said heating means.

26. A tweezer-type heating device according to claim 25, wherein said at least one heating surface extends inwardly toward a central longitudinal axis of said pin portion at an acute angle relative to said attachment part.

27. A tweezer-type heating device according to claim 26, wherein said at least one heating surface is oriented so as to define an approximately 87° angle relative said attachment surface, thereby angling inwardly in conformance with J-type component leads and for engaging solder fillets at substrate leads.

28. A tweezer-type heating device according to claim 25, wherein said at least one heating surface extends outwardly away from a central longitudinal axis of said pin portion at an obtuse angle relative to said attachment part.

29. A tweezer device according to claim 25, wherein each heating tip element has a pair of heating surfaces.

30. A tweezer device according to claim 25, further comprising an alignment tool for properly aligning said tip elements with respect to each other within the mounting units; wherein the attachment part of each tip element comprises a flat plate-like member having a slot in an edge thereof which, when the tip elements are mounted in proper alignment within the mounting units, faces the other of the tip elements; and wherein said tool has a portion that is matingly receivable in said slot and surfaces engageable on a top surface of said plate-like member and the edge thereof while said tool portion is received in said slot as a means for simultaneously aligning the tip elements axially, laterally and rotationally with respect to each other and the mounting units.

31. An alignment tool according to claim 30, wherein said tool is a plate-like member having a generally T-shaped projecting tab on each of opposite sides thereof.

32. A tweezer-type heating device according to claim 3, wherein each hinge member is elastically flexible and at least, in part, serves as a means for producing arcuate movement of the tweezer legs away from each other.

* * * * *